United States Patent [19]

Bower et al.

[11] 3,999,403
[45] Dec. 28, 1976

[54] THERMAL INTERFACE FOR CRYOGEN COOLERS

[75] Inventors: Chris M. Bower, Garland; Rodney E. Herrington, Dallas; Carol O. Taylor, Anna, all of Tex.

[73] Assignee: Texas Instruments Incorporated, Dallas, Tex.

[22] Filed: Dec. 6, 1974

[21] Appl. No.: 530,242

[52] U.S. Cl. .......................... 62/514 JT; 138/127; 165/81; 165/185; 285/226
[51] Int. Cl.² ........................................ F25B 19/00
[58] Field of Search ............ 62/45, 514 R, 514 JT; 285/226, 227, 228; 138/121, 124, 127; 165/81, 185

[56] References Cited
UNITED STATES PATENTS

| | | | |
|---|---|---|---|
| 2,039,781 | 5/1936 | Debenedetti | 138/121 |
| 3,807,188 | 4/1974 | Lagodmos | 62/514 R |

Primary Examiner—William F. O'Dea
Assistant Examiner—Ronald C. Capossela
Attorney, Agent, or Firm—Harold Levine; Rene E. Grossman; Alva H. Bandy

[57] ABSTRACT

An infrared receiver having a thermal conductive device for providing continuous thermal contact between a detector cooling means and an IR detector is disclosed. The thermal conductive device is bellows shaped and constructed from laminated layers of copper, nickel and copper or other suitable materials having the necessary thermal conductivity and elasticity at operating temperatures.

15 Claims, 4 Drawing Figures

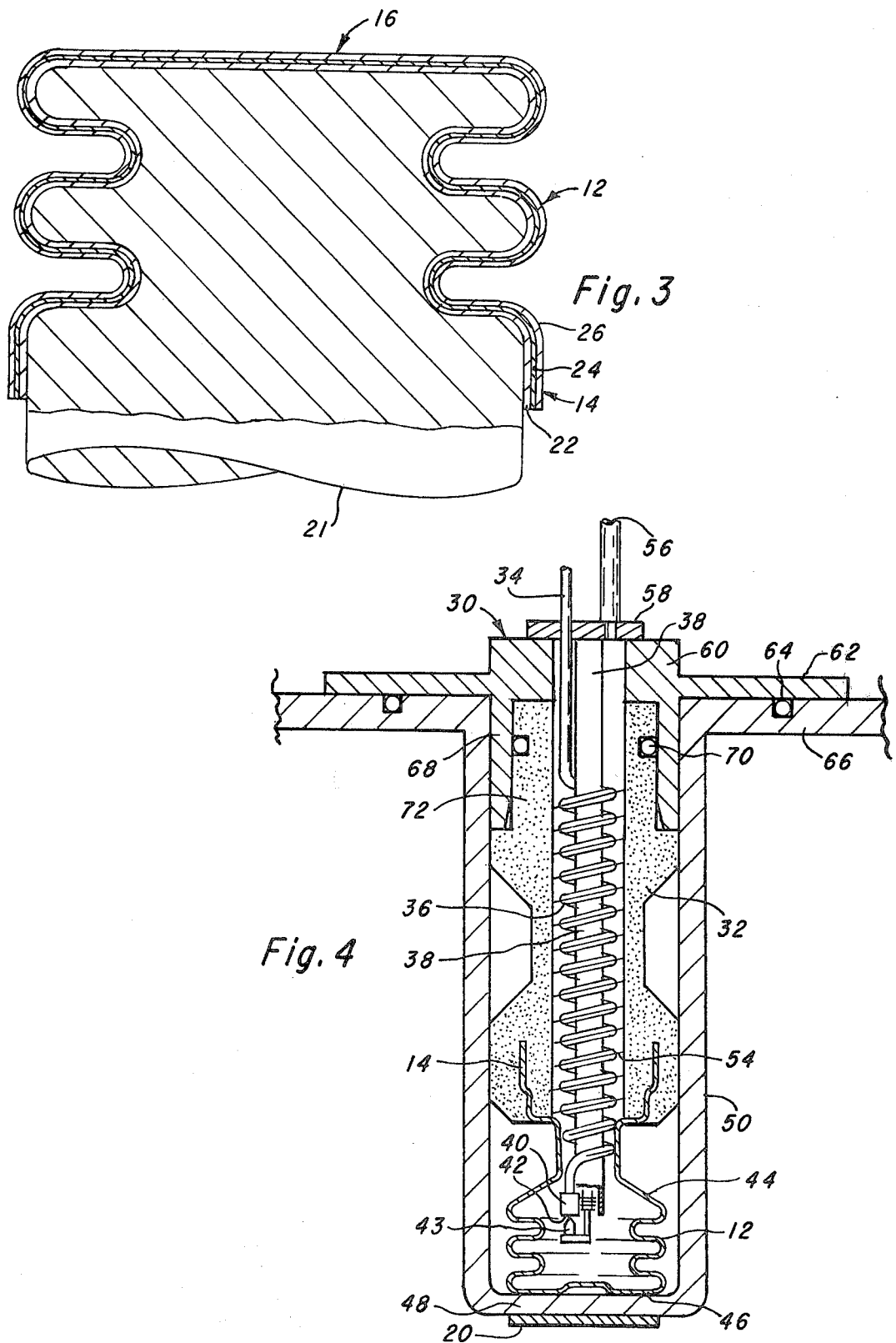

THERMAL INTERFACE FOR CRYOGEN COOLERS

This invention relates to a thermal energy detector and more particularly to an infrared receiver.

In the past, radiant energy receivers have had the detector array permanently mounted upon the cold finger of the refrigerator, and the refrigerator has been either an open cycle or closed cycle refrigerator system. Many problems resulted from the use of this system. These problems stem from the reliability, maintainability, power, heat dissipation, and weight of such prior art systems. For example, the reliability of the prior art systems have been dependent upon the mean time before failure of the refrigerators rather than the detectors. To alleviate these problems, a modular construction was developed in which the detectors were mounted upon a Dewar cold finger end adapted to fit over and be removed from the cold finger of the refrigerator. Because of the difficulty in maintaining thermal contact between the cooler cold finger and the Dewar cold finger and, this system suffered considerable loss of cooling capacity. To alleviate this problem, a heat transfer mechanism comprising a copper cup and spring arrangement was used. A spring was fitted in the cup and when the cup was fitted over the cooler cold finger the spring was compressed between the ends of the cooler cold finger and cup to push the bottom of the cup against the Dewar cold finger end supporting the detector of the detector module. The cup was coated with a heat sink compound to insure thermal contact between the cup and cold finger and between the cup and IR detector assembly. The problem with this device was that as the temperature dropped during the cooling process the heat sink compound solidified and bonded the cup to the cold finger. This bonding action occurred before the cold finger was completely contracted, thus, causing the interface between the cup and the IR detector assembly to open and thereby break the thermal contact between the cooler cold finger and the Dewar cold finger end of the detector module.

Accordingly, it is an object of this invention to provide an improved infrared receiver.

Another object of the invention is to provide improved heat exchange between the refrigerator and detector of a modular infrared receiver.

Still another object of the invention is to provide a heat transfer mechanism which is reliable, simple in construction and economical to manufacture.

Yet another object of the invention is to provide an infrared receiver having increased detector cooling efficiency.

Briefly stated, the improved infrared receiver invention comprises a cooling means, such as a refrigerator or cryostat, a detector means including a scanning mechanism for scanning on a detector of a detector module a scene radiating energy, a display for visually displaying the scene, and a heat transfer device having an elastic bellows providing thermal contact between either the refrigerator's cold finger or the cryostat and the Dewar cold finger supporting the detector of the detector module. The elastic bellows is fabricated from a suitable elastic material or materials which separately or together exhibit elasticity or springiness along with a high value of thermal conductivity. By forming the materials into the bellows form, the heat transfer device can contract or expand with any assembly tolerance stack-ups, or thermal contractions and expansions to automatically maintain thermal contact between the refrigerator or cryostat and the detector.

The novel features characteristic of the embodiment of the invention may best be understood by reference to the following detailed description when read in conjunction with the accompanying drawings, wherein:

FIG. 3 is a cross-sectional view showing the method of fabricating the laminated structure of the bellows of the heat transfer device; and FIG. 4 is a cross-sectional view of the second embodiment of the invention.

Figure 1:
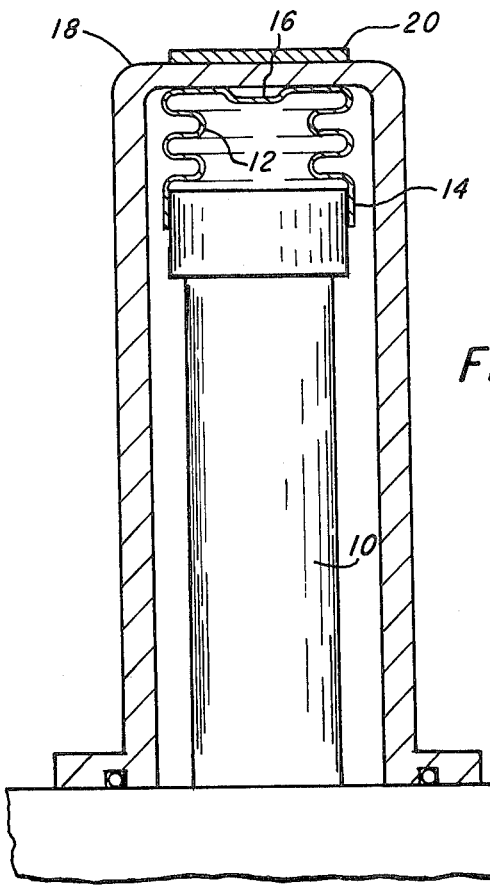
FIG. 1 is a cross-sectional view of the first embodiment of the invention.

Referring to the drawings and in particular to FIG. 1 for a description of the improved infrared receiver. As the structures other than the heat transfer device involved in the infrared receiver are all in existence and within the knowledge of those skilled in the art, a detailed description of the optical scanner used to scan the scene emanating the radiant energy for the detector, the detector used to produce electrical signals representative of the scene, the signal processing circuitry used to process the electrical signals for display, and the display used to visually display the scene is not included. Those desiring a detailed description of these structures are referred to U.S. Pat. No. 3,742,238 issued June 26, 1973.

A cold finger 10 of a cryogenic refrigerator such as, for example, a Sterling cycle refrigerator supports at one end an elastic bellows 12. The elastic bellows may be constructed of any suitable material or materials having suitable elasticity and thermal conductivity. The bellows 12 has a cup shaped end 14 to receive an end portion of the cold finger 10 and a substantially flat surfaced end 16 to provide good thermal contact with the detector supporting cold finger or substrate 18 of a detector 20. To insure maximum thermal contact of the bellows 12 with the cold finger 10 and detector supporting substrate 18, a suitable heat sink compound, such as that sold under the trademark Type 120 Thermal Joint Compound by Wakefield Engr. Inc., is used to coat the interior of the bellows cup end and flat surface of the end abutting the detector support substrate.

Figure 2:
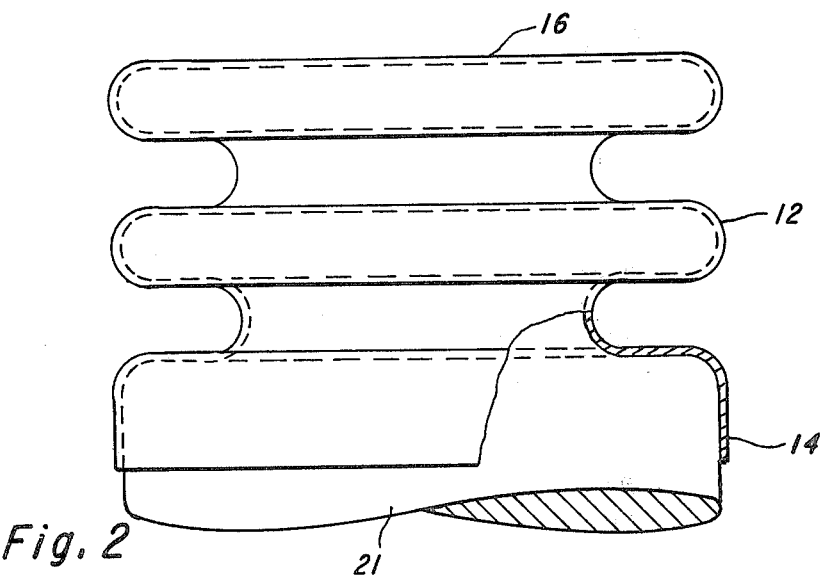
FIG. 2 is a partial cross-sectional view of the embodiment shown in FIG. 1.

The bellows 12 (FIGS. 2 and 3) is a tubular laminated metal bellows, formed by a suitable process such as, for example, electroplating first a layer of copper 22 over a bellows shaped mandrel 21, then a layer of nickel 24, and a layer of copper 26 over the nickel layer. Although other materials and layer thicknesses can be used, excellent results have been obtained with a laminated structure having layers of copper 22 and 26, each about 0.002 inch thick, covering the major surfaces of a layer of nickel 24 about 0.0005 inch thick. The bellows shaped mandrel 21 may be, for example, a metal having a melting point below that of the laminated layers in order that it may be removed by heating, or it may be of a metal, such as aluminum, which can be removed by a chemical etchant such as potassium hydroxide (KOH).

In operation the bellows 12 (FIG. 1) is inserted in a compressed state between the cold finger 10 and the detector support cold finger or substrate 18 and the cold finger cooled down to the operating temperature of the detector 20. A suitable detector is, for example, a HgCdTe detector having an operating temperature of 77° K. With the cooling of the cold finger 10, the cold finger contracts away from the detector supporting substrate. The bellows 12 owing to the elasticity of the nickel or other spring layer expands with the contraction of the cold finger to maintain the thermal contact between the cold finger 10 and the detector support cold finger or substrate 18. With the detector cooled to its operating temperature a scene is scanned by an optical scanner and infrared energy is detected by the detector 20. The detector 20 produces electrical signals representative of the scene; these electrical signals are coupled to a display means for visually displaying the scene.

In the second embodiment of the invention (FIG. 4) in which parts corresponding to the parts of the first embodiment are correspondingly numbered, the bellows 12 of the heat transfer device is adapted for use in a cryostat 30. The cryostat 30 may be any suitable cryostat, such as the Demand Flow Cryostat sold by Bendix Corporation. The cryostat 30 is mounted in an adapter 72. The cryostat 30 has a conduit 34 carrying a suitable cryogen, such as, for example, compressed nitrogen or air from a source thereof (not shown) to a tubular heat exchanger 36 spirally wound around the cryostat stem or core 38. The tubular heat exchanger terminates in a restricted end portion 40 having a nozzle 42 attached thereto. A needle valve 43 is connected to a sealed bellows mounted in the cryostat stem. When the bellows becomes warm it expands to open the needle valve 43 to admit cryogen into the space confined by the bellows 12; when cooled the sealed or sensing bellows inside the cryostat stem 38 contracts to close the needle valve 43. With the the opening of the needle valve 43, the compressed cryogen expands through the nozzle 42, liquifies and goes into the interior of the bellows 12 of a heat exchange device 44. The liquid cryogen withdraws heat through the end 46 of the bellows 12, and end 48 of the dewar stem 50 and from the HgCdTe detector 20 to cool the detector to its operating temperature of about 77° K. The heat derived from the detector gasifies the liquid cryogen and the gas is vented through heat sink fin 54 formed on the heat exchanger tubing to the atmosphere through vent 56. The cooled gas passing over the fin 54 removes heat from the cryogen passing through the heat exchanger to the nozzle. The cryostat stem or core 38 has an outwardly extending flange member 58 at one end which is attached to an adapter plate 60. The adapter plate 60 is a cup shaped member having outwardly extending flange 62 adapted to engage an O-ring 64 carried by a flange 66 extending outwardly from the stem 50 of a dewar. The O-ring seal which comes in contact with the adapter plate and dewar flange prevents the cryostat from cryo-pumping air into the dewar as a result of the cooling effect. The lip 68 of the cup 60 extends beyond O-ring 70 which is mounted in a recess formed in adapter 72. The O-ring 70 operates to seal off the area between the adapter 72 and dewar stem 50 to prevent cryo-pumping air into the dewar stem.

The adapter 72 may be fabricated from any suitable material having a low value of thermal conductivity, such as polyurethane foam, and acts as a sleeve for the heat exchanger to form a passage containing the cooling fin 54. The passage maintains the gas in a heat exchanging relation with the cooling fin of the heat exchanger as it is vented. The adapter 72 terminates in sealing engagement with the cup shaped end 14 of bellows 12 and acts to seal the interior of the bellows from the cavity of the dewar stem 50. The end 14 of bellows 12 is formed into the adapter 72 during fabrication of the adapter. The bellows 12 is made by electroplating cooper and nickel over a bellows shaped mandrel. The plating sequence is to plate for example, about 0.002 inch copper, 0.0005 inch nickel and 0.002 inch copper on the mandrel in the order listed. During installation the bellows is preloaded, that is, slightly compressed to insure positive contact with the bottom of the dewar stem. In addition, thermal conductive grease is applied to the interface between the bellows and the bottom of the dewar stem. The bottom of the bellows has a slight recess formed therein to facilitate even loading of the dewar stem. A middle portion of the adapter 72 can be reduced in cross-section, as shown, to decrease the heat conduction path through the adapter.

Although several embodiments of the invention have been described herein, it will be apparent to a person skilled in the art that various modifications to the details of construction shown and described may be made without departing from the scope of this invention.

What is claimed is:

1. An infrared receiver comprising:
   a. cooling means including a cold finger and a sleeve member, said sleeve member enclosing the cold finger in a spaced relationship and having a flat end surface;
   b. radiant energy detector means mounted upon the flat surface of the sleeve member; and
   c. a flexible cup shaped heat exchange device thermally interconnecting the spaced cold finger and flat end surface of the radiant energy detector means supporting sleeve member, said flexible cup shaped heat exchange device including a flexible tubular bellows having a closed end adapted to engage substantially the flat end surface of the sleeve member of the cooling means, a flexible side wall depending from the closed end, and an open end adapted to seat on the cold finger whereby when said cold finger with the flexible cup shaped heat exchange device attached is inserted in the sleeve member of the cooling means the flexible heat exchange device is compressed to force the closed end of the flexible heat exchange device against the flat end surface of the sleeve member to maintain thermal exchange engagement throughout a cooling cycle.

2. An infrared receiver according to claim 1 wherein the cooling means includes a refrigerator.

3. An infrared receiver according to claim 1 wherein the cooling means includes a cryostat.

4. An infrared receiver according to claim 1 wherein the radiant energy detector means includes a HgCdTe detector.

5. An infrared receiver according to claim 1 wherein said flexible side wall depending from the closed end of the flexible tubular bellows comprises a laminated structure of an elastic metal layer in contact with a thermal conductive metal layer.

6. An infrared receiver according to claim 5 wherein the layer of elastic metal is nickel.

7. An infrared receiver according to claim 5 wherein the thermal conductive metal is essentially copper.

8. An infrared receiver according to claim 5 wherein the laminated metal of the flexible bellows comprises a layer of copper, a layer of nickel upon the layer of copper, and a layer of copper upon the layer of nickel.

9. An infrared receiver according to claim 1 wherein the closed end of the flexible tubular bellows has a centrally disposed recess for even loading of the detector bearing flat surface of the sleeve member.

10. An infrared receiver comprising:
   a. a cooling means wherein said cooling means is a cryostat;
   b. a radiant energy detector means; and
   c. a heat exchange device of unitary construction engaging the cryostat and radiant energy detector means in a heat exchanging relationship, said heat exchange device including: (i) a source of cryogen, (ii) a heat exchanger coupled to the source of cryogen, (iii) a bellows shaped heat exchanger device, said heat exchanger opening into the interior of the bellows shaped heat exchanger device, (iv) a dewar including a stem supporting the detector means, and (v) an adapter means supporting the bellows shaped heat exchanger device against the dewar stem portion supporting the detector means and forming with the exterior of the heat exchanger a vent passage for venting gaseous cryogen from the bellows shaped heat exchanger device and removing heat from the cryogen passing through the heat exchanger.

11. An infrared receiver according to claim 10 wherein said bellows shaped heat exchange device comprises an elastic body of high thermal conductive material.

12. An infrared receiver according to claim 11 wherein said elastic body of high thermal conductive material of the bellows shaped heat exchange device comprises a laminated body.

13. An infrared receiver according to claim 12 wherein the laminated body comprises a layer of copper, a layer of nickel, and a layer of copper.

14. An infrared receiver according to claim 10 wherein the bellows shaped heat exchange device included one end portion in sealing engagement with the adapter means, a hollow bellows shaped body portion in communication with the heat exchanger and a substantially flat end surface, said hollow bellows shaped body portion having an elasticity sufficient to maintain the substantially flat end surface in contact with the portion of the dewar stem supporting the detector and a thermal conductivity sufficient to remove heat to cool the detector to operating temperatures throughout the operation of the infrared receiver, said hollow shaped bellows and adapter means being in sealing engagement coacting to reduce the cryogen cavity of the dewar stem.

15. An infrared receiver according to claim 14 wherein the substantially flat end of the heat exchange device includes a recess for even loading of the dewar stem.

* * * * *